(12) United States Patent
Tseng et al.

(10) Patent No.: US 7,059,909 B1
(45) Date of Patent: Jun. 13, 2006

(54) ELECTRICAL CARD CONNECTOR WITH IMPROVED CONTACT STRUCTURE

(75) Inventors: Gwou-Jong Tseng, Tu-Chun (TW); Senbing Zhao, Shenzhen (CN)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/165,762

(22) Filed: Jun. 24, 2005

(30) Foreign Application Priority Data

Dec. 1, 2004 (CN) .................. 2004 2 0109406 U

(51) Int. Cl.
*H01R 24/00* (2006.01)
(52) U.S. Cl. ...................................... 439/630
(58) Field of Classification Search ............... 439/630, 439/631, 679, 489
See application file for complete search history.

(56) References Cited

U.S. PATENT DOCUMENTS

| | | | |
|---|---|---|---|
| 6,004,155 A * | 12/1999 | Wu .............................. | 439/489 |
| 6,159,051 A * | 12/2000 | Chang ......................... | 439/630 |
| 6,425,775 B1 * | 7/2002 | Chang et al. ................ | 439/188 |
| 6,540,560 B1 * | 4/2003 | Ito et al. ...................... | 439/633 |
| 6,579,126 B1 * | 6/2003 | Narumo et al. ............. | 439/630 |
| 6,672,904 B1 * | 1/2004 | Chen ........................... | 439/631 |
| 6,685,512 B1 * | 2/2004 | Ooya .......................... | 439/630 |
| 6,709,281 B1 * | 3/2004 | Shishikura et al. ......... | 439/188 |
| 6,902,407 B1 * | 6/2005 | Ito et al. ....................... | 439/60 |
| 2004/0113249 A1 * | 6/2004 | Ito et al. ...................... | 257/679 |

\* cited by examiner

*Primary Examiner*—Tulsidas C. Patel
*Assistant Examiner*—Harshad Patel
(74) *Attorney, Agent, or Firm*—Wei Te Chung

(57) ABSTRACT

There are provided a contact structure for a card connector (100). The contact structure includes a plurality of contacts (2) which are arranged in parallel with one another. Among the plurality of contacts, there is a detect contact (22) which is the longest contact and disposed at one of the farthest ends of the card connector, a power contact (24) at substantially center portion thereof, a ground contact (25) adjacent to the power contact. Other contacts are the signal contacts (21) for communicating signal. A connect contact, which is integrally formed with the power contact and transversely extends toward to the detect contact, is designed for connecting the detect contact and the power contact. The detect contact, the power contact and the connect contact cooperate to form a detect switch.

16 Claims, 7 Drawing Sheets

ELECTRICAL CARD CONNECTOR WITH IMPROVED CONTACT STRUCTURE

BACKGROUND OF THE INVENTION

1. Field of the Invention

This invention generally relates to a card connector designed for the connection between an electronic apparatus, such as digital cameras, mobile telephones or the like and an IC card, more particularly, to a contacting structure of the card connector.

2. Description of the Prior Art

In recent years, the greater compactness and the greater functional advance for the electronic apparatuses such as the digital cameras, mobile telephones or the like have been pursued and realized. It is commonplace to enlarge storage capacity or extend various functions by incorporating an IC card containing the built-in CPU and the memory IC. Conventionally, it is common practice that the IC card to be loaded into the conventional card connector which is designed for the connection between an electronic apparatus and the IC card.

Generally speaking, the card connector is designed for permitting free insertion or removal of the IC card and is provided with a plurality of contacts, which are arranged therein for electrically contacting with the pads provided either on the surface or the back of the IC card, so that the IC card can be electrically connected with various signal processing circuit or the power source circuit on the side of the electronic apparatus.

In order to confirm whether the IC card is securely inserted into the card connector or not, in many conventional cases, two separate contact cooperating to form a card identification switch are provided at farthest end of the card connector. Take U.S. Patent application publication No. 2004/0113249 A1 for an example, the patent publication discloses a conventional card connector providing an insulative housing, a metal shield enclosing the insulative housing and a plurality of contacts being arranged in parallel with one another within the housing. Among the plurality of the contacts, there are two contacts for connecting with power source, two grounding contacts, a detect contact which is disposed at farthest end thereof and a number of signal contacts. One of the two grounding contacts is adjacent to the detect contact, which is the shortest contact among the above all contacts, while the detect contact is the longest contact among the above all contacts. When an electrical card is inserted into the card connector, the grounding contact first contact with the pad of the electrical card, while the detect contact lastly come into contact with the corresponding pad of the electrical card. As a result, the shortest ground contact and the longest detect contact cooperate to form a detect switch. The detect switch is not closed until the detect contact electrically contact with the corresponding pad of the IC card. The power source on the electronic apparatus begins to provide power for the IC card unless the detect switch is closed.

However, with the trend of miniaturization of electronic apparatus, the card connector must be more compact accordingly. Apparently, in the case where the card identification switch by arranging two respective contacts at farthest end of the card connector, such a composition tends not only to make the connector structure complex but also to increase the cost of the card connector accordingly.

Hence, an improved contact structure of the electrical connector is desired to overcome the above problems.

BRIEF SUMMARY OF THE INVENTION

It is an object of the present invention to provide a card connector which has a compact contact structure.

In order to attain the objective above, an electrical connector according to the present invention provides a contact structure for a card connector. The contact structure includes a plurality of contacts which are arranged in parallel with one another. Among the plurality of contacts, there is a detect contact which is the longest contact and disposed at one of the farthest ends of the card connector, a power contact at substantially center portion thereof, a ground contact adjacent to the power contact. Other contacts are the signal contacts for communicating signal. A connect contact, which is integrally formed with the power contact and transversely extends toward to the detect contact, is designed for connecting the detect contact and the power contact. The detect contact, the power contact and the connect contact cooperate to form a detect switch. When the electrical card is inserted into the card connector, the signal contacts, the power contact and the ground contact first contact with the pads of the electrical card, then the electrical card is further inserted into the card connector, the detect contact is urged to downwardly move to contact with the connect contact so that the detect switch is closed.

Other objects, advantages and novel features of the invention will become more apparent from the following detailed description of the present embodiment when taken in conjunction with the accompanying drawings.

BRIEF DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Reference will now be made in detail to the preferred embodiment of the present invention.

An card connector 100 according to the present invention is applicable to the electronic apparatuses such as the digital cameras, PDAs (Personal digital Assistances), PCs (Personal computers), mobile telephones or the like.

Figure 1:
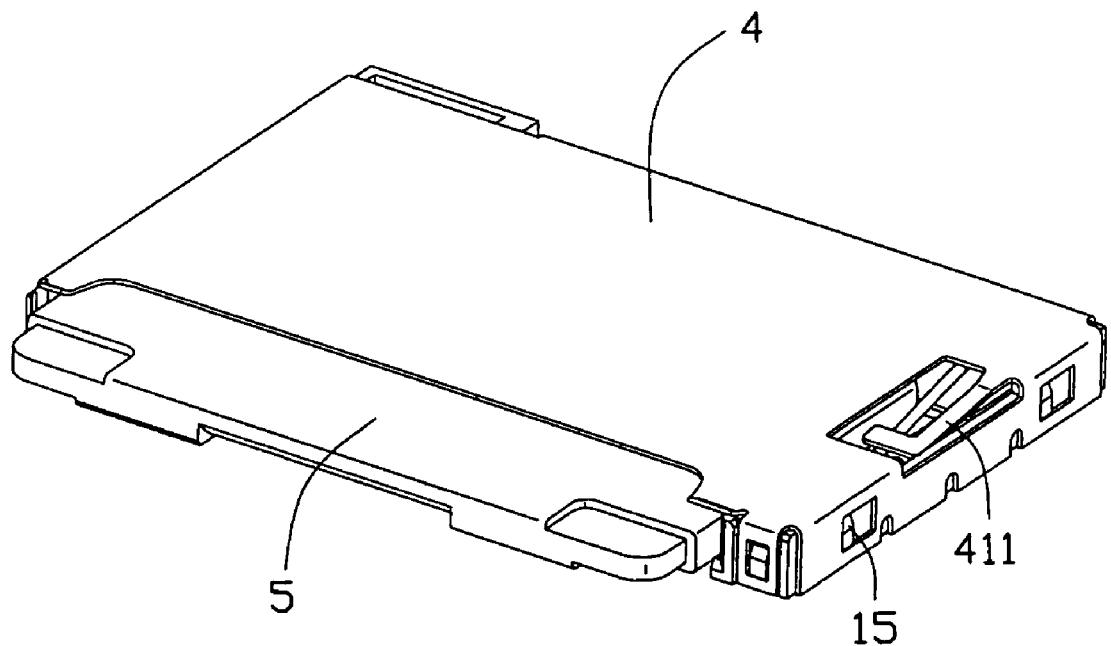
FIG. 1 is a perspective view of a card connector according to the present invention with the card being inserted into the card connector.
Figure 2:
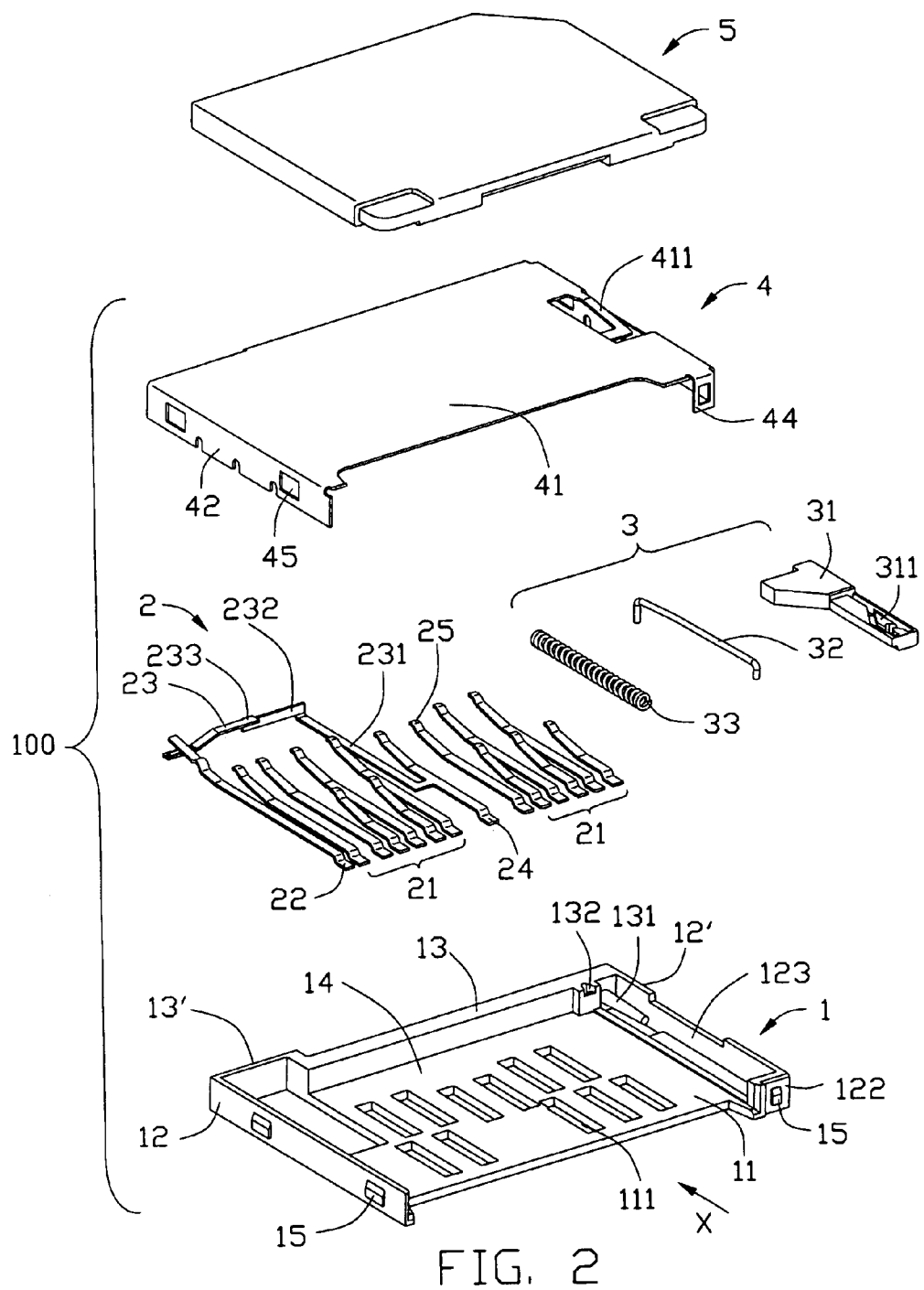
FIG. 2 is an exploded view of FIG. 1.
Figure 3:
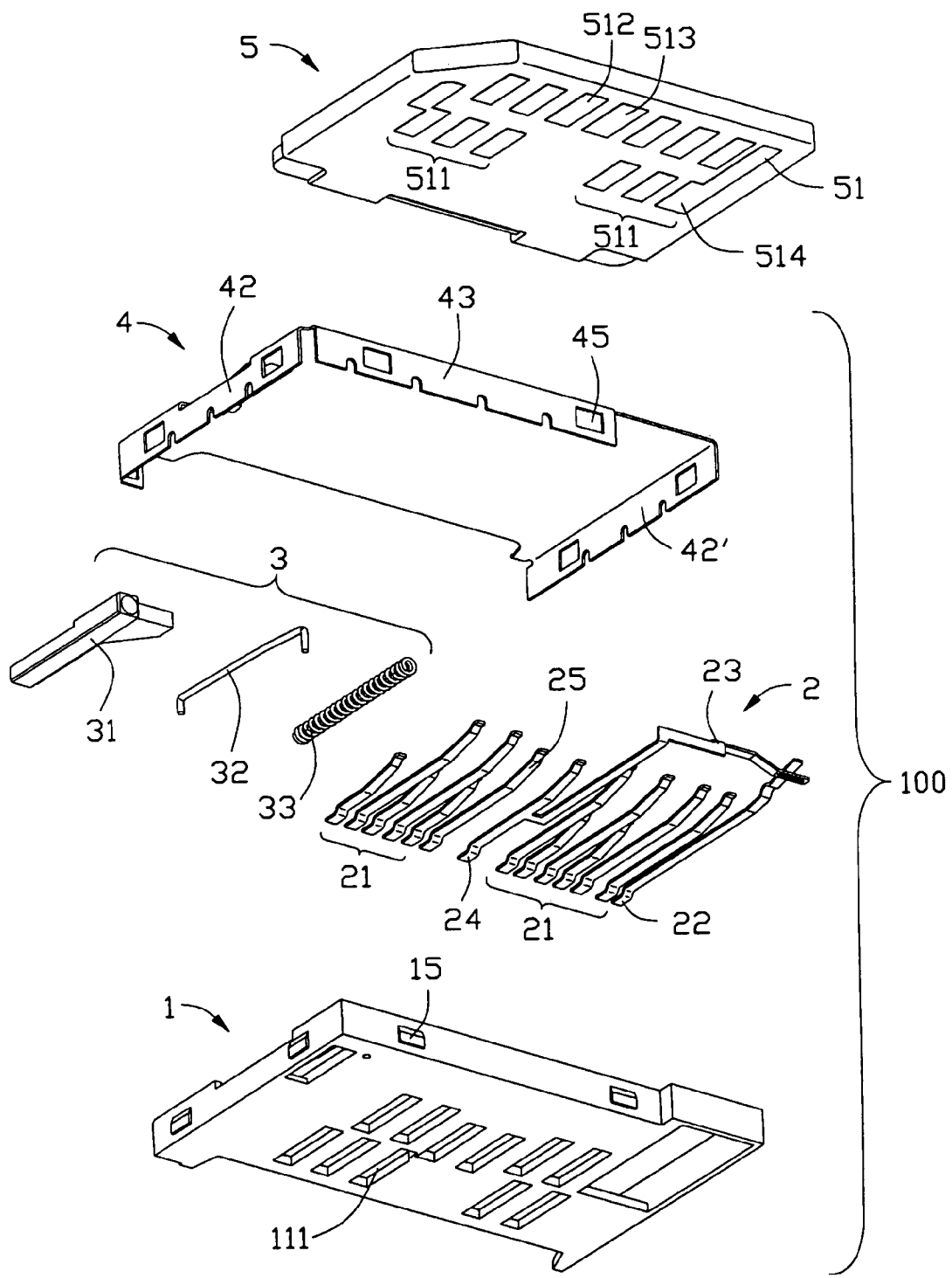
FIG. 3 is an another exploded view of the card connector from another perspective view.

An electrical card 5 to be loaded into the card connector 100 is, as shown in FIGS. 1–3, provided a plurality of pads 51 for electrically connecting with the corresponding contacts 2 of the card connector 100. The pads 51 formed on one side of the electrical card 5 are respectively a power pad 513 disposed substantially at the center portion, a ground pad 512 adjacent to the power pad 513 and a detect pad 514 disposed on one end of the electrical card 5. Other pads are the signal pads 511 for serving as exchanging and communicating data with memory. These pads 51 are different in length in the direction X, in which the electrical card 5 is inserted into the electrical connector 100.

Next, the structure of the card connector 100 will be described briefly. Further referring to FIG. 2, the card connector 100 includes a lower housing 1 and an upper cover 4 mounted on the lower housing 1. A plurality of contacts 2 and a reject mechanism 3 for guiding the electrical card 5 to be inserted into or ejected are received in the lower housing.

The lower housing 1 comprises a substantially rectangular base 11, whereon there are provided a number of fixing grooves 111, formed for permitting the contacts 2 to be pushed thereinto for being held securely, a first side wall 12, a second side wall 12' and a back wall 13 interconnecting the first and the second side walls 12, 12'. A receiving space 14 for receiving the electrical card 5 is formed by the above walls 12, 12', 13 and the base 11. The first side wall 12 is a little longer than the second side wall 12', thereby forming a projecting portion 13' adjacent to the first side wall 12. The numeral 122 represent an assisting piece extending from a free end of the second side wall 12' toward to the first side wall 12. A receiving room 123 for receiving the eject mechanism 3 is formed by the base 11, the second side wall 12' and the assisting piece 122. A post 131 extends from the back wall 13 into the receiving room 123. A recess 132 is defined on an upper surface of the back wall 13. The numeral 15 represents a latch member for engaging with the upper cover 4, the latch member being integrally with the above walls 12, 12', 13 and the assisting piece 122.

The upper cover 4 is formed from a sheet metal by applying the punching and pressing processes and comprises a ceiling 41, a first side wall 42, a second side wall 42' and a back wall 43 so as to cover the lower housing 1 from above. Further, the ceiling 41 defines a downwardly bent spring arm 44 adjacent to the second side wall 42' for urging the eject mechanism 3 to eject the electrical card 5 from the card connector 100. Further the numeral 45 represents a plurality of openings, which is designed for engaging with the latch member 15 of the lower housing 1.

Figure 6:
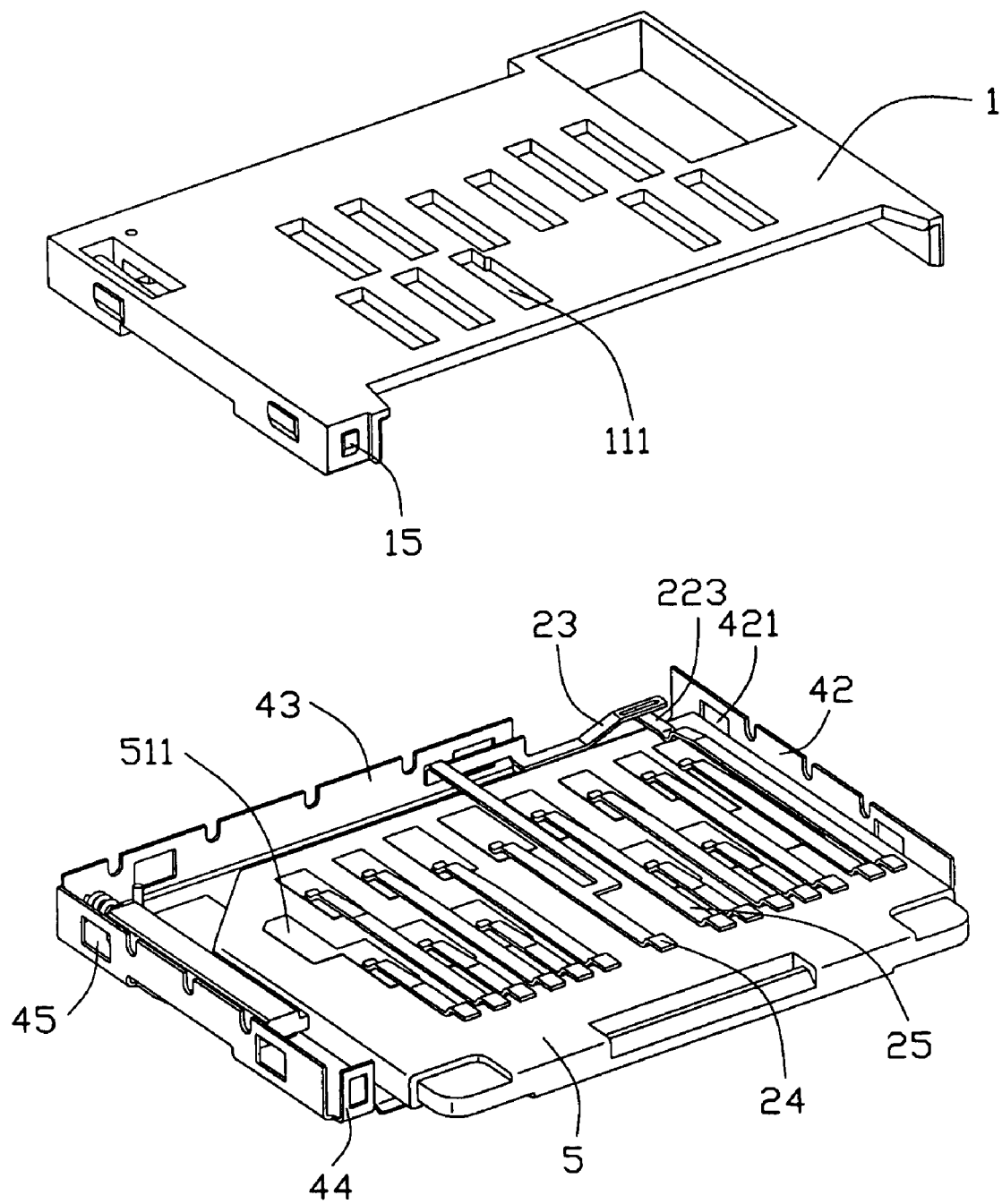
FIG. 6 is a partially exploded view of the card connector.
Figure 7:
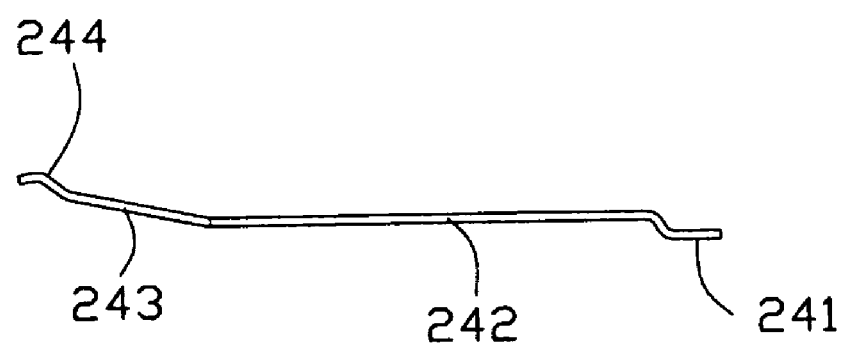
FIG. 7 is a side view of the power contact and the detect contact of the card connector.
Figure 7:
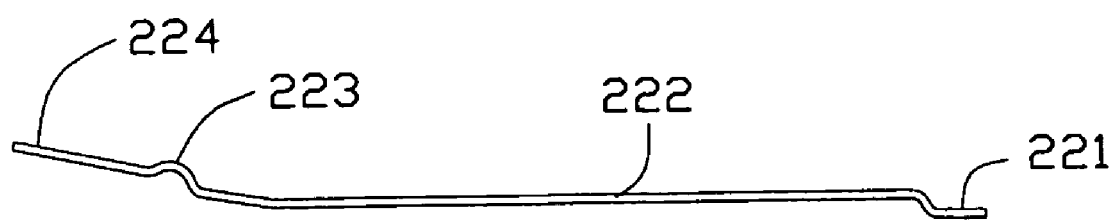

Referring to FIG. 2 again and in conjunction with FIGS. 6–7, a plurality of contacts 2 are arranged substantially parallel to one another and fixed within the grooves 111 of the lower housing 1. Next, the structure, arrangement and the fashion of each of the contacts 2 and the corresponding pads 51 according to the present invention will be described.

In FIG. 2, a contact 22, which appears at one of the outmost ends of the contacts 2, is a detect contact. The contact 24 appearing at about the center among the contacts 2 is a power contact. However, it is noted that in this preferred embodiment, the detect contact 22 connects with a power source of the printed circuit board. The numeral 23 represent a connect contact which is integrally with the power contact 24. The connect contact 23 transversely extends from a substantially middle of the power contact 24 to dispose below the detect contact 22, which includes a horizontal portion 231 connecting with the power contact 24, a vertical portion 232 upwardly bent from a free end of the horizontal portion 231 and a contact portion 233 below the detect contact 22. The numeral 25 represent a ground contact, which is adjacent to the power contact 24. All other contacts 21 are the signal contacts for communicating the signal.

Concerning the lengths of the contacts 2 along the direction X in which the electrical card 5 is to be inserted into the card connector 100. The detect contact 22 is longest of all the contacts 2. In the condition, when the electrical card 5 is inserted into the card connector 100, the signal contacts 21, the power contact 24 and the ground contact 25 are firstly respectively electrically connect with the data pad 511, the power pad 513 and the ground pad 512 of the electrical card 5. Then, the electrical card is further inserted into the card connector 100, the detect contact 22 which is longest of all the contacts 2 is urged to move downwardly to contact with the connect contact 23. Due the detect contact 22 connects with the power source of the printed circuit board, the system begin to provide power to the electrical card 5 via the detect contact 22, the connect contact 23 and the power contact 24.

Figure 4:
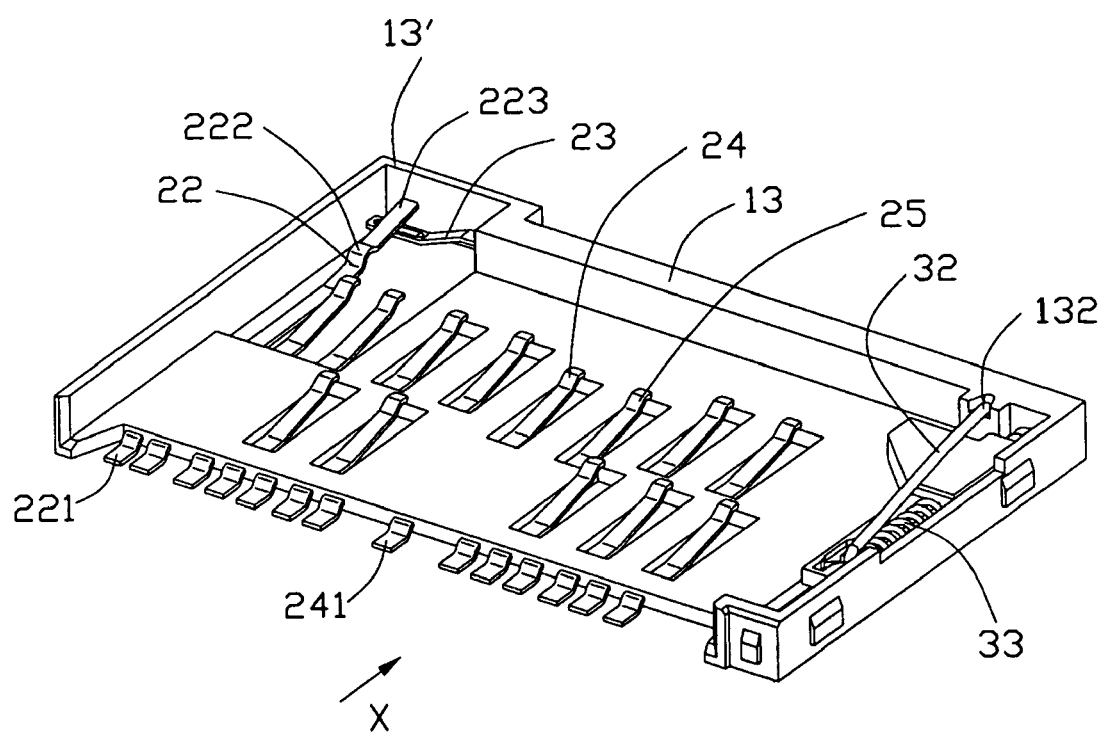
FIG. 4 is a partially assembled view of the card connector with the top cover being removed.
Figure 5:
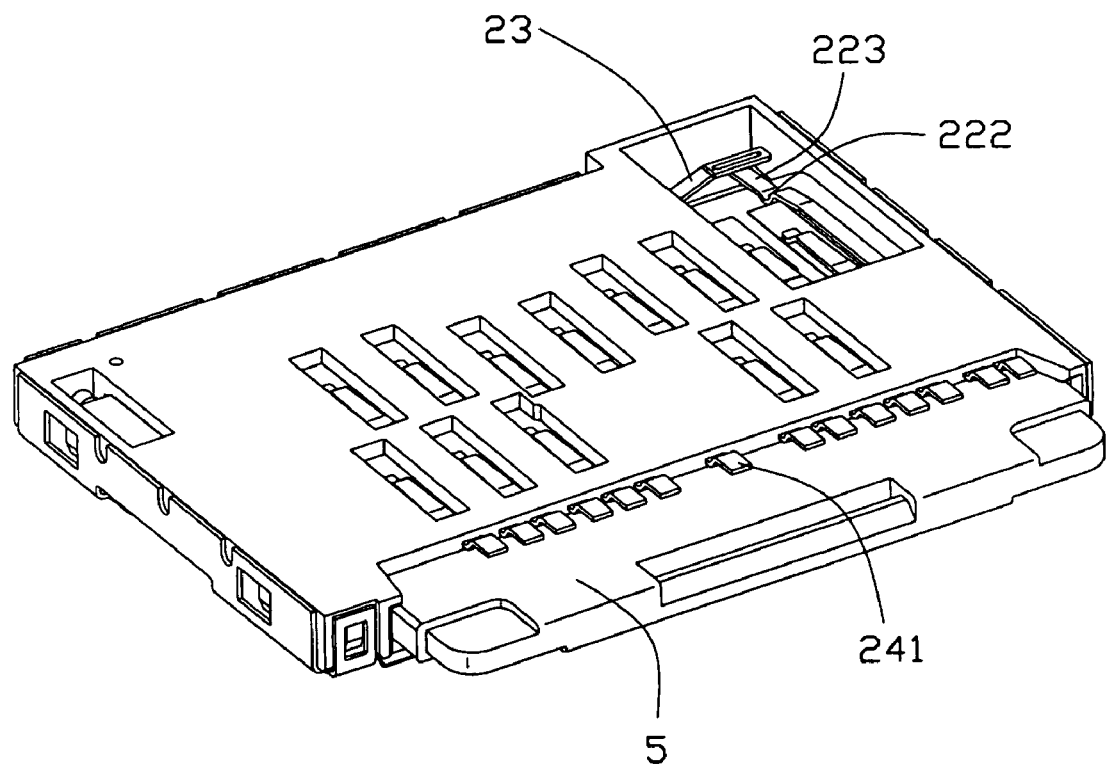
FIG. 5 is another perspective view of the card connector from an bottom view with the card being inserted thereinto.

Next, the structure of the contacts 2 will be described hereinafter, which is illustrated in FIG. 7. Each contact is similar except for the detect contact, so it will take the power contact 24 for an example to illustrate the structure of the contact 2. The power contact 24 includes a soldering portion 241 to be soldered on the printed circuit board, a stationary portion 242 fixed within the grooves 111 of the lower housing 1, an elastic portion 243 and a contact portion 244 for contacting with the pads 51 of the electrical card 5. By the way, in this preferred embodiment, although the soldering portion 241 of the power contact 24 is soldering on the printed circuit board, the soldering portion 241 only connects with the punch carrier not electrically connects with printed circuit board in this embodiment. Further, in FIG. 4, the contact portion 244 and the elastic portion 243 of each contact come above the grooves 111 when the contact are pushed into the grooves 111. The detect contact 22 includes a soldering portion 221, a stationary portion 222, an arched shaped press portion 223 and a long contact portion 224.

It is to be understood, however, that even though numerous, characteristics and advantages of the present invention have been set fourth in the foregoing description, together with details of the structure and function of the invention, the disclosed is illustrative only, and changes may be made in detail, especially in matters of number, shape, size, and arrangement of parts within the principles of the invention to the full extent indicated by the broad general meaning of the terms in which the appended claims are expressed.

What is claimed is:

1. A card connector adapted for mounting on a printed circuit board to interconnect an electrical card containing a number of pads with the printed circuit board, comprising:
   an insulative housing defining a receiving space for receiving the electrical card;
   a plurality of contacts received in the insulative housing, the plurality of contacts including a detect contact, a number of signal contacts for electrically connecting with the pads of the electrical card, a power contact electrically connecting with the corresponding pad of the electrical card; wherein the detect contact and the power contact are electrically detachably connectable to each other.

2. The card connector according to claim 1, wherein the power contact includes a connect portion transversely extending and bent from a side portion thereof for connecting with or disconnecting from the detect contact.

3. The card connector according to claim 1, wherein the detect switch further includes a connect contact connecting with the detect contact, and wherein the power contact is connectable with the connect contact.

4. The card connector according to claim 1, wherein the detect contact is longer than the power contact along the direction in which the electrical card is to be inserted into the card connector.

5. The card connector according to claim 1, wherein said power contact includes a solder tail for mechanically but not electrically connecting to the printed circuit board.

6. The card connector according to claim 1, wherein said power contact and said detect contact are not connected to each other when no card is received in the housing.

7. The card connector according to claim 1, further including a connect contact to connect said detect contact and said power contact.

8. The card connector according to claim 7, wherein said connect contact is constantly connected with only one of the power contact and the detect contact.

9. The card connector according to claim 8, wherein said only one of the power contact and the detect contact is the power contact.

10. The card connector according to claim 7, wherein said connect contact is essentially immoveable and connects said power contact and said detect contact only when the card is completely inserted into the housing.

11. A card connector adapted for mounting on a printed circuit board to interconnect an electrical card with the printed circuit board, comprising:
   an insulative housing defining a receiving space therein, an electrical card insertable into the receiving space along a card insertion direction;
   a top cover mounted on the insulative housing;
   a plurality of contacts received in the insulative housing, the plurality of contacts including a number of signal contacts and a detect switch; wherein the detect switch includes a detect contact and a power contact electrical connect/disconnect with each other, and wherein the power contact has a power contact portion at a substantially middle portion of the housing along a traverse direction perpendicular to said card insertion direction.

12. An card connector adapted for mounting on a printed circuit board to interconnect an electrical card containing a number of pads with the printed circuit board, comprising:
   an insulative housing defining a receiving space;
   a plurality of contacts including a number of signal contacts, a power contact and a detect contact; wherein when the electrical card is inserted into the card connector, the power contact and the signal contact first electrically connect with the electrical card, then when the electrical card is further inserted into the card connector, the detect contact lastly contacts with the electrical card and then comes into electrically connecting with the power contact.

13. The card connector according to claim 12, wherein the plurality of contacts further includes a connect contact integrally formed with the power contact, and wherein the connect contact transversely extends toward the detect contact for connecting therewith.

14. The card connector according to claim 13, wherein the detect contact does not contact with the connect contact in a normal position when the electrical card is not fully inserted into the card connector.

15. The card connector according to claim 11, wherein the switch contact is mounted to a lateral side portion of the housing, and wherein the power contact includes a connect contact extending along said traverse direction for connecting/disconnecting with the detect switch.

16. The card connector according to claim 12, wherein the detect contact is the longest contact among the plurality of contact.

* * * * *